US012781781B2

(12) United States Patent
Li et al.

(10) Patent No.: US 12,781,781 B2
(45) Date of Patent: Nov. 3, 2026

(54) BATTERY SECURING COMPONENT

(71) Applicant: CHONGQING QIULONG TECHNOLOGY CO., LTD., Chongqing (CN)

(72) Inventors: Bing Li, Chongqing (CN); Tao Liu, Chongqing (CN); Junyan Yi, Chongqing (CN); Zegui Li, Chongqing (CN); Ke Ma, Chongqing (CN); Jiaxiong Chen, Chongqing (CN)

(73) Assignee: CHONGQING QIULONG TECHNOLOGY CO., LTD., Chongqing (CN)

( * ) Notice: Subject to any disclaimer, the term of this patent is extended or adjusted under 35 U.S.C. 154(b) by 210 days.

(21) Appl. No.: 18/897,879

(22) Filed: Sep. 26, 2024

(65) Prior Publication Data

US 2026/0016034 A1 Jan. 15, 2026

(30) Foreign Application Priority Data

Jul. 12, 2024 (CN) ........................ 202410935031.X

(51) Int. Cl.
*F16B 5/06* (2006.01)
*B62J 43/16* (2020.01)
(Continued)

(52) U.S. Cl.
CPC ............. *F16B 5/0635* (2013.01); *B62J 43/16* (2020.02); *B62J 43/20* (2020.02); *H01M 50/249* (2021.01);
(Continued)

(58) Field of Classification Search
CPC ..................................................... F16B 5/0635
See application file for complete search history.

(56) References Cited

U.S. PATENT DOCUMENTS 12,522,102 B2 * 1/2026 Bucher ................ A01B 69/008
12,612,128 B2 * 4/2026 Takeuchi ................ B62J 43/16
(Continued)

FOREIGN PATENT DOCUMENTS

CN 210618370 U 5/2020
CN 115535120 A 12/2022
(Continued)

OTHER PUBLICATIONS

Extended European Search Report issued for European Patent Application No. 24201945.3, dated Feb. 25, 2025, 9 pages.

*Primary Examiner* — Brian L Swenson
(74) *Attorney, Agent, or Firm* — HSML P.C.

(57) ABSTRACT

A battery securing component configured to be mounted on a vehicle body is provided. A battery is vertically disposed on the vehicle body. The battery securing component includes: a lifting column vertically arranged on a side of the battery, and a lower end of the lifting column being threadedly connected to the vehicle body to cause the lifting column to be capable of moving up and down by rotating; a pressing sleeve rotatably sleeved on the lifting column and configured to be moved up and down in synchronization with the lifting column; a pressing arm being formed on the pressing sleeve by protruding toward the battery, higher than the battery) and an elastic engaging structure configured to drive the pressing sleeve to rotate in synchronization with the lifting column, and arranged between the pressing sleeve and the lifting column.

10 Claims, 4 Drawing Sheets

(51) Int. Cl.
*B62J 43/20* (2020.01)
*H01M 50/249* (2021.01)
*H01M 50/262* (2021.01)

(52) U.S. Cl.
CPC ...... *H01M 50/262* (2021.01); *H01M 2220/20* (2013.01)

(56) References Cited

U.S. PATENT DOCUMENTS

| | | | | |
|---|---|---|---|---|
| 12,643,648 | B2 * | 6/2026 | Hidaka | B63H 21/17 |
| 2010/0136425 | A1 * | 6/2010 | Gau | B60L 50/64 429/187 |
| 2016/0280306 | A1 * | 9/2016 | Miyashiro | B60L 50/64 |
| 2019/0115576 | A1 * | 4/2019 | Krantz | B60R 16/04 |
| 2022/0219564 | A1 * | 7/2022 | Aoto | B60L 53/68 |
| 2023/0291051 | A1 * | 9/2023 | Klein | B62J 43/13 |
| 2025/0125397 | A1 * | 4/2025 | Wu | H01M 10/0404 |
| 2025/0368056 | A1 * | 12/2025 | Anghel | B60L 50/64 |

FOREIGN PATENT DOCUMENTS

| | | | |
|---|---|---|---|
| CN | 116404343 | A | 7/2023 |
| CN | 219524107 | U | 8/2023 |
| CN | 220577423 | U | 3/2024 |

* cited by examiner

BATTERY SECURING COMPONENT

CROSS-REFERENCE TO RELATED APPLICATIONS

This application claims the priority to Chinese patent application No. 202410935031.X, filed on Jul. 12, 2024, the content of which is incorporated herein by reference in its entirety.

TECHNICAL FIELD

The present disclosure relates to the technical field of battery arrangement of vehicle, and in particular to a battery securing component.

BACKGROUND

In order to promote energy conservation and emission reduction, all major cities have started to advocate the use of electric vehicles, such as electric buses, electric cars and electric motorcycle. Electric motorcycle becomes one of the most convenient electric vehicles for personal travel at present, especially the straddle-type electric motorcycle, which is popular with many young people due to its light-weight, silent, good looking, minimalist features and the like.

At present, in the straddle-type electric motorcycle, the battery is generally disposed at the position corresponding to the fuel tank on the fuel motorcycle. For example, in the anti-back rotation structure of the battery securing bracket of the electric motorcycle disclosed in the Chinese patent CN210618370U, a storage compartment is formed by the left and right main beams, and an opening is formed on the top of the storage compartment for the user to insert and remove the battery conveniently. In order to limit the vertical movement of the battery in the storage compartment, as configured in the electric motorcycle disclosed in the Chinese patent CN220577423U and the battery removal and installation method disclosed in the Chinese patent CN116404343A, generally, the opening of the storage compartment is provided with a compartment cover that can be flipped to open and close the storage compartment. Meanwhile, the compartment cover can tightly press the battery when being flipped to close the storage compartment. When inserting and removing the battery, the compartment cover is flipped open to expose the opening of the storage compartment. After the battery is inserted into the storage compartment, the compartment cover is flipped closed to press the battery. In order to fully expose the opening of the storage compartment so that the battery can be removed and inserted more smoothly, the compartment cover generally needs to be flipped at a large angle, which not only makes placing and removing the battery more troublesome and inconvenient, but also limits the design of the compartment cover and the vehicle head when considering to avoid the flipped compartment cover interfering with the structures in the front portion of the vehicle.

SUMMARY

According to various embodiments of the present disclosure, a battery securing component is provided.

In order to achieve the above object, the present disclosure adopts the following technical solutions.

A battery securing component configured to be mounted on a vehicle body is provided. A battery is vertically disposed on the vehicle body. The battery securing component includes: a lifting column vertically arranged on a side of the battery, and a lower end of the lifting column being threadedly connected to the vehicle body to cause the lifting column to be capable of moving up and down by rotating; a pressing sleeve rotatably sleeved on the lifting column and configured to be moved up and down in synchronization with the lifting column; a pressing arm being formed on the pressing sleeve by protruding toward the battery, the pressing arm being higher than the battery; and an elastic engaging structure configured to drive the pressing sleeve to rotate in synchronization with the lifting column, and arranged between the pressing sleeve and the lifting column. A pressure receiving groove is formed on a top of the battery and adapted to the pressing arm. The pressing arm is capable of falling into the pressure receiving groove to press and secure the battery. In a circumferential direction of the pressing sleeve, there is a height difference between upper edges of a higher sidewall and a lower sidewall of the pressure receiving groove. The higher sidewall is located on a path along which the lifting column rotates to move down, and the lower sidewall is located on a path along which the lifting column rotates to move up. When the lifting column drives the pressing sleeve to rotate until the pressing arm abuts against any one of the higher sidewall and the lower sidewall of the pressure receiving groove and continues to rotate in such direction, the elastic engaging structure is elastically disengaged, and the pressing sleeve only moves up and down synchronously with the lifting column and rotates relative to the lifting column.

In an embodiment, the elastic engaging structure includes an engaging groove and an engaging protrusion matching the engaging groove. The engaging groove is formed on an end surface or an inner side surface of the pressing sleeve. In the circumferential direction of the pressing sleeve, two sidewalls of the engaging groove are inclined, and a top opening size of the engaging groove is greater than a bottom size of the engaging groove. The engaging protrusion is connected to the lifting column through an elastic member. The engaging protrusion is engaged into the engaging groove under an action of the elastic member. When the engaging protrusion is located in the engaging groove, the pressing sleeve rotates in synchronization with the lifting column. When the lifting column drives the pressing sleeve to rotate until the pressing arm abuts against any one of the higher sidewall and the lower sidewall of the pressure receiving groove and continues to rotate in such direction, each of the inclined sidewalls of the engaging groove abuts against the engaging protrusion to cause the engaging protrusion to be disengaged from the engaging groove. The pressing sleeve is rotatable relative to the lifting column, and the elastic member is elastically deformed, and causes the engaging protrusion to maintain a tendency to move toward the pressing sleeve.

In an embodiment, a plurality of the engaging grooves and a plurality of the engaging protrusions are evenly distributed on the pressing sleeve in the circumferential direction of the pressing sleeve. The number of the engaging grooves is greater than the number of the engaging protrusions.

In an embodiment, the lifting column has an upper limiting part and a lower limiting part that protrude in a radial direction. The pressing sleeve abuts against and is between the upper limiting part and the lower limiting part, and the pressing sleeve is capable of moving up and down synchronously with the lifting column.

In an embodiment, an annular groove is formed on the lifting column and below the pressing sleeve. An elastic stop ring is disposed on the annular groove. A portion of the elastic stop ring outside the annular groove serves as the lower limiting part.

In an embodiment, the engaging groove is formed on an upper end surface of the pressing sleeve, and the engaging protrusion is connected to the upper limiting part through the elastic member.

In an embodiment, the lifting column has an upper limiting part and a lower limiting part that protrude in a radial direction. The pressing sleeve is located between the upper limiting part and the lower limiting part. A connecting ring abuts against and is between an upper end of the pressing sleeve and the upper limiting part. A lower end of the pressing sleeve abuts against the lower limiting part, and the pressing sleeve is capable of moving up and down synchronously with the lifting column. The connecting ring is sleeved on the lifting column, is connected to the lifting column and rotatable in synchronization with lifting column. A connecting part is formed on an outer side surface of the connecting ring by protruding radially. A free end of the connecting part is bent and extends in the circumferential direction to form a connecting arm. A free end of the connecting arm protrudes downward to form the engaging protrusion. The connecting arm is configured as the elastic member.

In an embodiment, a groove is formed on an upper end surface of the connecting ring. A lower end surface of the upper limiting part has a protrusion corresponding to the groove. When the protrusion is located in the groove, the connecting ring and the lifting column are connected for synchronized rotation.

In an embodiment, an upper end of the lifting column is provided with a turning cap having an opening facing downward. The turning cap is fixedly connected to the lifting column by a screw. A lower end of the turning cap is adjacent to the pressing sleeve. The upper end of the lifting column, the upper limiting part, the connecting ring, the connecting part and the connecting arm are all located inside the turning cap. A side limiting part protrudes from the connecting part radially. A side limiting groove matching the side limiting part is formed on an inner wall of the turning cap. The side limiting groove extends to the lower end of the turning cap in a vertical direction. When the side limiting part is located in the side limiting groove, the connecting ring and the lifting column are connected for synchronized rotation.

In an embodiment, a side of the pressing sleeve away from the battery is provided with a first stopping part. An end of the first stopping part is adjacent to the pressing sleeve and another end of the first stopping part is connected with the vehicle body. The first stopping part has elasticity. A second stopping part protrudes from an outer side surface of the pressing sleeve. A height of the second stopping part is equal to a height of the first stopping part. When the pressing arm rotates away from a top of the battery, the first stopping part is deformed by being pressed by the second stopping part, and then allows the second stopping part to move in the circumferential direction from one side to another side of the first stopping part.

ILLUSTRATION FOR REFERENCE NUMERALS

1, battery; 2, lifting column; 3, pressing sleeve; 4, pressing arm; 5, engaging groove; 6, engaging protrusion; 7, pressure receiving groove; 8, lower sidewall; 9, higher sidewall; 10, stud; 11, upper limiting part; 12, elastic stop ring; 13, connecting ring; 14, connecting part; 15, connecting arm; 16, protrusion; 17, first stopping part; 18, second stopping part; 19, turning part; 20, turning cap; 21, side limiting part; and 22, screw.

DETAILED DESCRIPTION

In order to make the objects, technical solutions and advantages of the embodiments of the present disclosure clearer, the technical solutions in the embodiments of the present disclosure will be described below clearly and completely with reference to the accompanying drawings of the embodiments of the present disclosure.

First Embodiment

Figure 1:
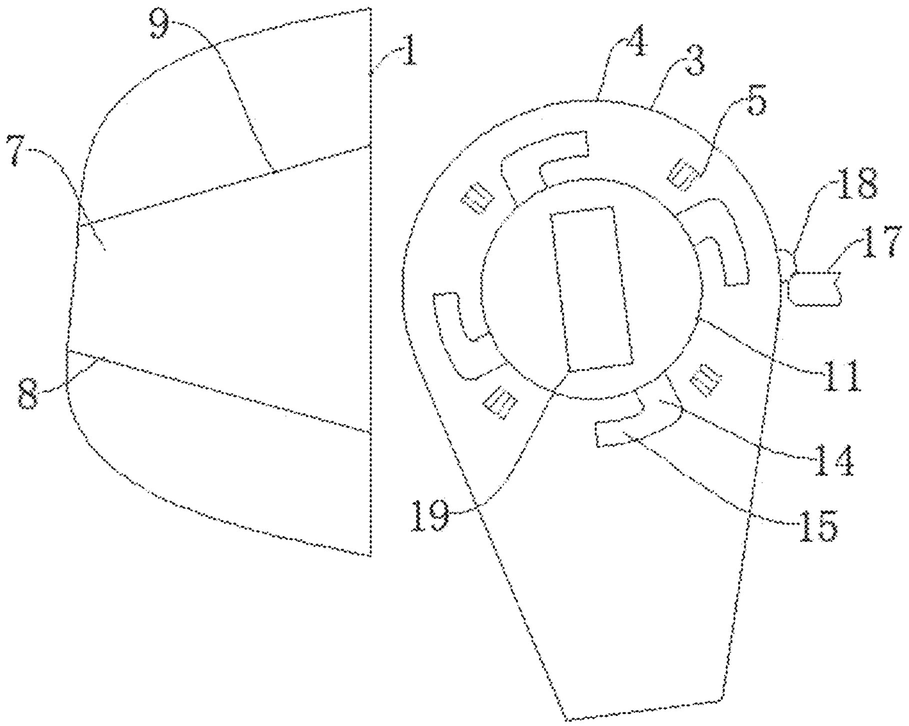
FIG. 1 is a top view of a battery securing component in an unlocked state according to a first embodiment.
Figure 2:
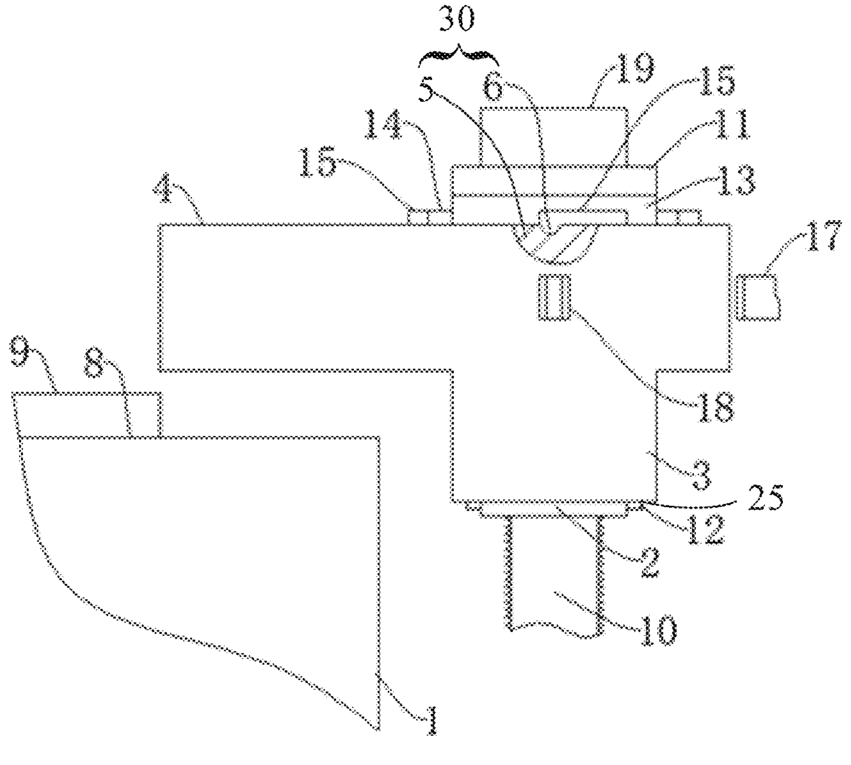
FIG. 2 is a front view showing a pressing arm in the first embodiment rotating to be above a pressure receiving groove.

Referring to FIGS. 1 and 2, a battery securing component is mounted on a vehicle body. A battery 1 is vertically arranged on a vehicle body. The battery securing component includes a lifting column 2. The lifting column 2 is vertically arranged on a side of the battery 1. A lower end of the lifting column 2 is threadedly connected to the vehicle body, so that the lifting column 2 can be rotated and moved up and down. A pressing sleeve 3 is sleeved on the lifting column 2. The pressing sleeve 3 is in a slidable cooperation with the lifting column 2 and can be moved up and down with the lifting column 2.

An engaging groove 5 is formed on an end surface or an inner side surface of the pressing sleeve 3. In a circumferential direction of the pressing sleeve 3, two sidewalls of the engaging groove 5 are inclined, and a size of an opening of the engaging groove 5 is greater than a size of the bottom of the engaging groove 5. An engaging protrusion 6 matching the engaging groove 5 is connected to the lifting column 2 through an elastic member. The engaging protrusion 6 is movable in a depth direction of the engaging groove 5. When the engaging protrusion 6 is located in the engaging groove 5, the pressing sleeve 3 can rotate as the lifting column 2 moves. When the engaging protrusion 6 is separated from the engaging groove 5, the pressing sleeve 3 can rotate relative to the lifting column 2, and the elastic member is elastically deformed to cause the engaging protrusion 6 to have a tendency to move toward the pressing sleeve 3.

A pressing arm 4 is formed on the pressing sleeve 3 and protrudes toward the battery 1. An end of the pressing arm 4 is higher than the battery 1. A pressure receiving groove 7 adapted to the end of the pressing arm 4 is formed on the top of the battery 1. The pressing arm 4 can be moved down into the pressure receiving groove 7 to press and fix the battery 1. There is a height difference between upper edges of the two sidewalls of the pressure receiving groove 7 in the circumferential direction of the pressing sleeve 3. In the rotation direction that lowers the lifting column 2, the higher sidewall 9 of the two sidewalls of the pressure receiving groove 7 is located behind the lower sidewall 8. The pressing arm 4 can be moved up and separated from the pressure receiving groove 7, and can pass over the lower sidewall 8 and rotates away from the top of the battery 1. The pressure receiving groove 7 being adapted to the end of the pressing arm 4 means that, in the circumferential direction of the pressing sleeve 3, the minimum size (width) of the pressure receiving groove 7 may be at least greater than the size of the end of the pressing arm 4, so that the end of the pressing arm 4 can be smoothly moved down into the pressure receiving groove 7, thereby pressing the battery. In other words, during implementation, in addition to the shapes of the pressure receiving groove and/or the end of the pressing arm 4 shown in FIG. 4 that are exactly matched, the pressure receiving groove and/or the end of the pressing arm 4 can also be rectangular, U-shaped, semi-circular, or even triangular, which is not specifically limited herein.

Unlike the flip-top compartment cover, in the battery securing component of the present disclosure, the pressing sleeve 3 is movably sleeved on the lifting column 2 that is vertically arranged, and the lifting column 2 serves as a rotating shaft configured for the rotatable connection between the pressing sleeve 3 and the vehicle body, so that the pressing arm 4 may be positioned above the battery 1 by horizontally rotating the pressing sleeve 3, to limit the vertical movement of the battery 1. The lifting column 2 is threadedly connected to the vehicle body, so that the lifting column 2 also serves as a height adjusting member configured for adjusting the height of the pressing sleeve 3 on the vehicle body. In this way, the pressing arm 4 of the pressing sleeve 3 can press and secure the battery 1 vertically by moving the pressing sleeve 3 up and down through rotating the lifting column 2.

In the battery securing component of the present disclosure, the engaging groove 5 and the engaging protrusion 6 are respectively arranged on the pressing sleeve 3 and the lifting column 2. The two sidewalls of the engaging groove 5 in the circumferential direction are inclined, and the engaging protrusion 6 is connected to the lifting column 2 through the elastic member, so that an elastic engaging structure 30 is formed between the pressing sleeve 3 and the lifting column 2, and can be disengaged in the circumferential direction when being subjected to a force. When the lifting column 2 is rotated and when the rotation of the pressing sleeve 3 is blocked, the engaging protrusion 6 may be disengaged from the engaging groove 5 under the guide of the inclined sidewall of the engaging groove 5, so that the pressing sleeve 3 can rotate relative to the lifting column 2, and the elastic member is elastically deformed. When the lifting column 2 is rotated and when the rotation of the pressing sleeve 3 is not blocked, after the pressing sleeve 3 and the lifting column 2 rotate relative to each other by a certain angle so that the engaging protrusion 6 faces the engaging groove 5 in the vertical direction, the engaging protrusion 6 may quickly fall into the engaging groove 5 under the elastic force of the elastic member. In this way, the pressing sleeve 3 and the lifting column 2 are connected and may rotate synchronously, so that the rotation of the lifting column 2 can directly drive the pressing sleeve 3 to rotate. Correspondingly, the pressure receiving groove 7 is formed at the top of the battery 1. The pressure receiving groove 7 has two sidewalls in the circumferential direction with different heights. When the end of the pressing arm 4 rotates to just above the pressure receiving grooves 7 and has not yet been moved down, the lower edge of this end of the pressing arm 4 is positioned higher than the lower sidewall 8 and lower than the higher sidewall 9.

Figure 3:
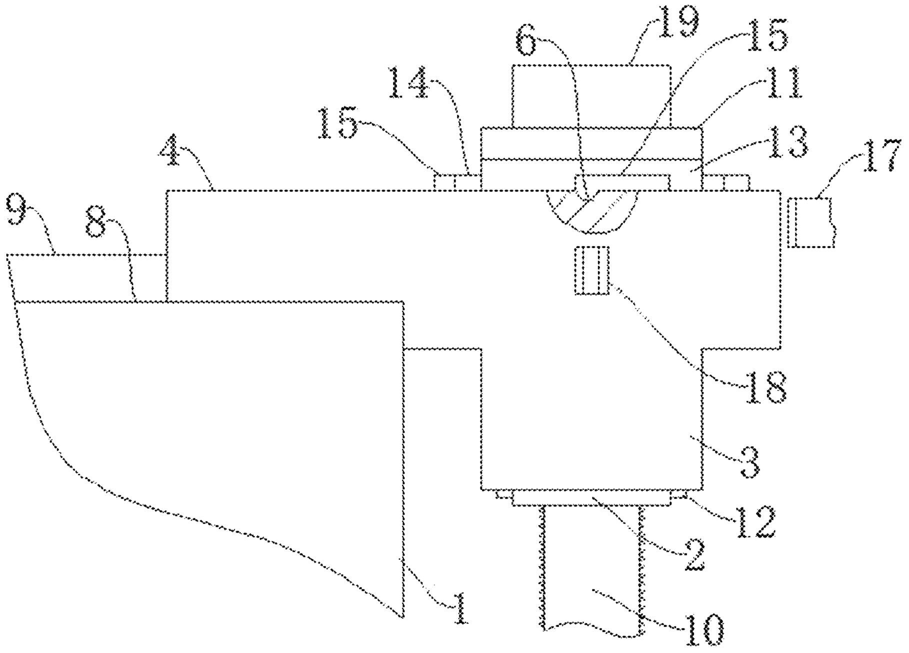
FIG. 3 is a front view showing the pressing arm in the first embodiment when lowering into the pressure receiving groove.
Figure 4:
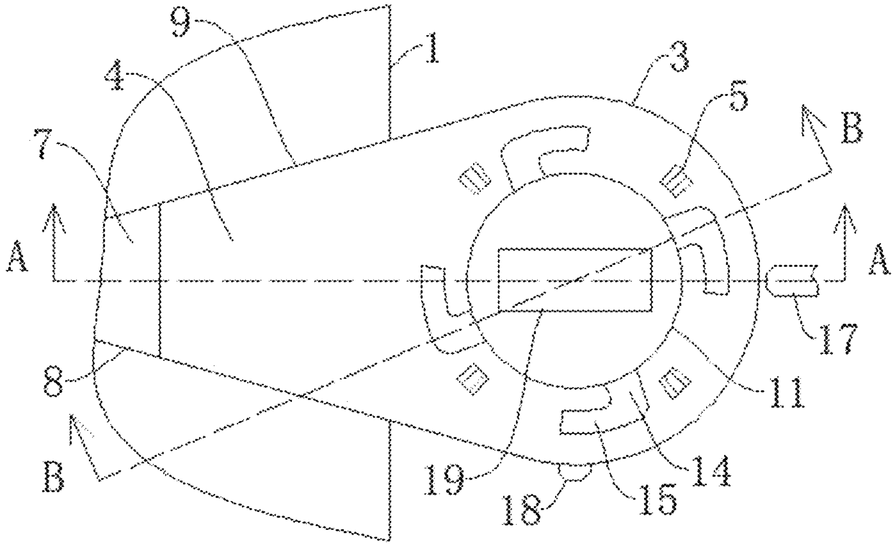
FIG. 4 is a top view of the battery securing component in a locked state according to the first embodiment.

For convenience of description, the rotation direction from the lower sidewall 8 to the higher sidewall 9 is defined as a clockwise direction, and the rotation direction from the higher sidewall 9 to the lower sidewall 8 is defined as a counterclockwise direction. As shown in FIG. 1, when the end of the pressing arm 4 deviates from the top of the battery 1, the battery securing component is in the unlocked state, and the battery 1 can be removed from and inserted in the vehicle body in the vertical direction. After the battery 1 is vertically put in, the lifting column 2 is rotated in the clockwise direction and the pressing sleeve 3 is rotated synchronously with the lifting column 2 without being blocked, so that the pressing sleeve 3 is moved downwards or lowered. As shown in FIG. 2, when the pressing sleeve 3 passes over the lower sidewall 8 and rotates to be above of the pressure receiving groove 7 along with the lifting column 2, the pressing sleeve 3 abuts against the higher sidewall 9, and the rotation of the pressing sleeve 3 is therefore blocked. In this case, the lifting column 2 may rotate relative to the pressing sleeve 3, and the pressing sleeve 3 moves downward with the rotation of the lifting column 2 in the clockwise direction. As shown in FIGS. 3 and 4, the lifting column 2 continues to rotate in the clockwise direction, and the pressing sleeve 3 only moves down with the rotation of the lifting column 2. Finally, the pressing arm 4 falls into the pressure receiving groove 7 and vertically presses and secures the battery 1, so that the battery securing component is in the locked state. When it is required to remove the battery 1, the lifting column 2 is rotated in the counterclockwise direction. In this case, the pressing sleeve 3 is blocked by the lower sidewall 8, so that the pressing sleeve 3 rotates relative to the lifting column 2. At this time, the pressing sleeve 3 only moves upward with the rotation of the lifting column 2. When the lower edge of the end of the pressing arm 4 is higher than the lower sidewall 8, the rotation of the pressing sleeve 3 is no longer blocked. The end of the pressing arm 4 rotates again with the lifting column 2 synchronously and rotates away from the top of the pressure receiving groove 7. When the end of the pressing arm 4 is not above the battery 1, the battery securing component returns to the unlocked state shown in FIG. 1, and then the battery 1 can be vertically removed from the vehicle body.

Figure 6:
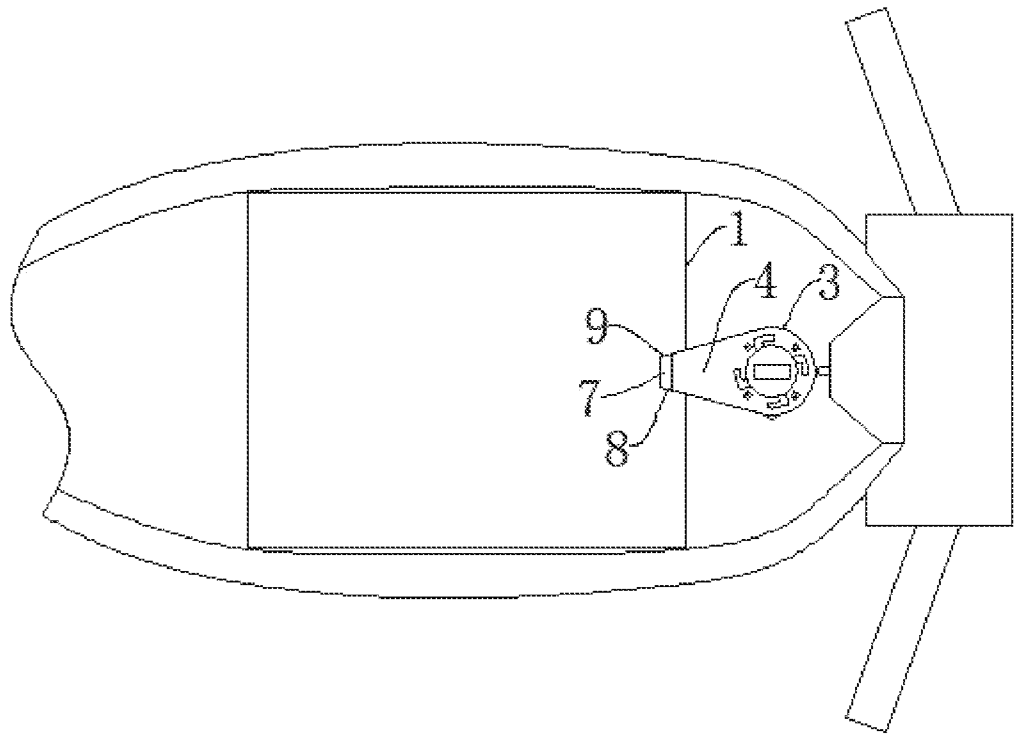
FIG. 6 is a schematic view showing the battery securing component when being in the front portion of the vehicle body according to the first embodiment.

In the battery securing component of the present disclosure, the lifting column 2 has functions of driving the pressing sleeve 3 to rotate and moving the pressing sleeve 3 up and down, so that such battery securing component is simple in structure and practical. By arranging the elastic engaging structure 30, which can be disengaged when being subjected to force in the circumferential direction, between the pressing sleeve 3 and the lifting column 2, and correspondingly arranging the pressure receiving groove 7 with two sidewalls of different heights in the circumferential direction, on the top of the battery 1, the pressing arm 4 can be rotated in synchronization with the lifting column 2 before rotating in the clockwise direction to be above the pressure receiving groove 7 and after moving upward in the counterclockwise direction and being separated from the pressure receiving groove 7. The pressing arm 4 can only move up and down with the rotation of the lifting column 2 after rotating with the lifting column 2 to be above the pressure receiving groove 7 and before moving upward in the counterclockwise direction and being separated from the pressure receiving groove 7. In this way, the locking and unlocking operations of the battery 1 only require rotating the lifting column 2. This makes the operations simple and can effectively solve the problem of inconvenient use of the conventional battery securing components of the electric motorcycle. In an embodiment, referring to FIG. 6, only one battery securing component needs to be provided on the vehicle body, so that the space required is small. The battery 1 can be inserted or removed by only rotating the pressing arm 4 by 90 degrees or less, so that the possibility of interference with other structural components on the vehicle body is relatively small, which is beneficial to reduce the difficulty in design and manufacturing.

In an embodiment, external threads can be formed on the lower end of the lifting column 2, and a threaded hole can be correspondingly formed on the vehicle body, so that the lifting column 2 is threadedly connected to the vehicle body, and a smooth rod section of the lifting column 2 is connected to the pressing sleeve 3. In this embodiment, referring to FIGS. 1 and 3, a stud 10 is fixedly and vertically arranged on the vehicle body, and a screw hole is formed on the lower end surface of the lifting column 2. In this way, the lifting column 2 is threadedly connected to the vehicle body through the cooperation between the stud 10 and the screw hole.

Referring to FIG. 4, a plurality of the engaging grooves 5 and the engaging protrusions 6 are evenly distributed in the circumferential direction of the pressing sleeve 3, and the number of the engaging grooves 5 is greater than that of the engaging protrusions 6. In this way, when the rotation of the pressing sleeve 3 is not blocked, the plurality of engaging protrusions 6 that are evenly distributed in the circumferential direction, are engaged in the plurality of engaging grooves 5 one by one, so that the elastic engaging structure 30 has better structural strength and stability, and the smooth rotation of the pressing sleeve 3 with the lifting column 2 can be ensured. The number of the engaging grooves 5 is greater than that of the engaging protrusions 6. In this way, after the pressing arm 4 is separated from the pressure receiving groove 7, the lifting column 2 and the pressing sleeve 3 can be rotated by a small angle relative to each other to restore the synchronous rotation connection between the lifting column 2 and the pressing sleeve 3, which can effectively reduce the idle stroke and improve the operation efficiency.

Figure 5:
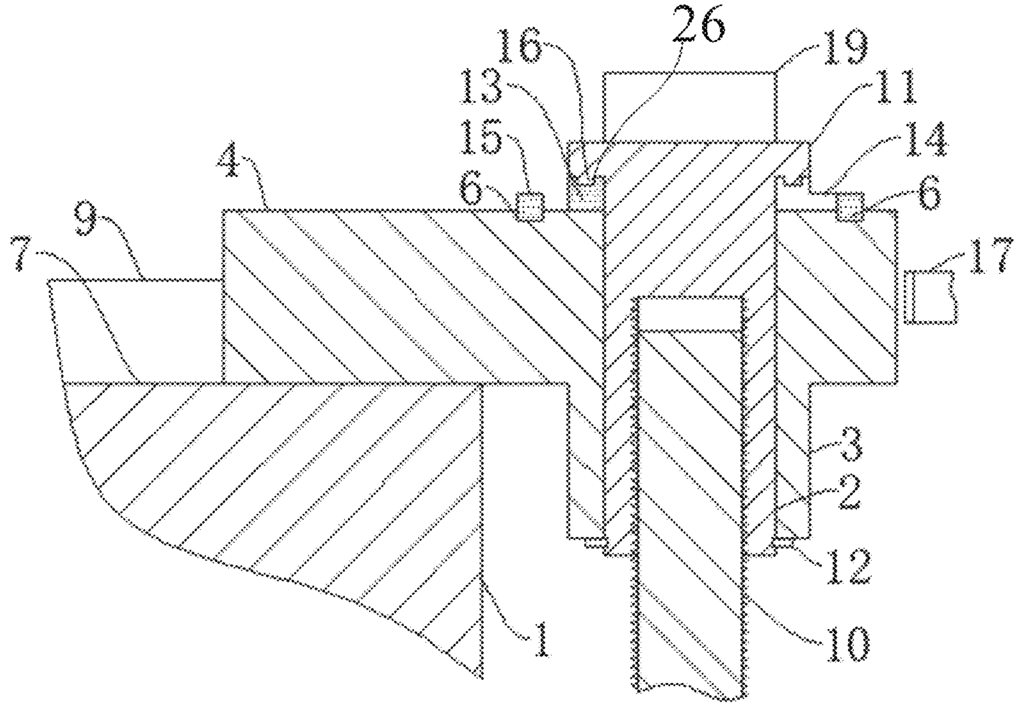
FIG. 5 is a schematic sectional view taken along a line A-A in FIG. 4.

Referring to FIGS. 3 and 5, the lifting column 2 has an upper limiting part 11 protruding in the radial direction and a lower limiting part. The pressing sleeve 3 abuts against and is between the upper limiting part 11 and the lower limiting part in the vertical direction, so that the pressing sleeve 3 can move up and down synchronously with the lifting column 2. In order to facilitate assembly, an annular groove 25 is formed on the lifting column 2 and below the pressing sleeve 3. An elastic stop ring 12 is disposed in the annular groove 25. A portion of the elastic stop ring 12 located outside the annular groove 25 serves as the lower limiting part. In this way, the pressing sleeve 3 can be sleeved on the lifting column 2 from the lower end of the lifting column 2, and then the elastic stop ring 12 is mounted, so as to fix the position of the pressing sleeve 3 on the lifting column 2 in the vertical direction.

In an embodiment, the engaging groove can be formed on the inner side surface of the pressing sleeve 3, a sliding groove is correspondingly formed on the outer side surface of the lifting column 2 in the radial direction. A slide block is disposed in the sliding groove as the engaging protrusion, and a compression spring is connected between the engaging protrusion and the bottom of the sliding groove. Alternatively, the engaging groove may be formed on the upper end surface of the pressing sleeve 3, a sliding groove is correspondingly formed on the lower end surface of the upper limiting part 11 in the axial direction, a slide block is disposed in the sliding groove as the engaging protrusion, and a compression spring is connected between the engaging protrusion and the bottom of the sliding groove.

In this embodiment, referring to FIGS. 3, 4 and 5, the engaging groove 5 is formed on the upper end surface of the pressing sleeve 3, and the engaging protrusion 6 is connected to the upper limiting part 11 through the elastic member. Specifically, a connecting ring 13 abuts against and is between the upper limiting part 11 and the pressing sleeve 3. The connecting ring 13 is sleeved on the lifting column 2, is connected to the lifting column 2 and may rotate in synchronization with the lifting column 2. A connecting part 14 is formed on the outer side surface of the connecting ring 13 and protrudes from the outer side surface of the connecting ring 13 in the radial direction. The free end of the connecting part 14 is bent and extends in the circumferential direction to form the connecting arm 15. The free end of the connecting arm 15 has a portion protruding downward to form the engaging protrusion 6. The connecting arm 15 has elasticity and serves as the elastic member. The engaging groove 5 is located outside the upper limiting part 11, and the position of the engaging groove 5 matches the position of the engaging protrusion 6 in the radial direction. In this way, the engaging protrusions 6 and the elastic members are all designed as one piece, so that the battery securing component can be assembled easily. In addition, in an embodiment, the connecting part 14, the connecting arm 15, and the engaging protrusion 6 may be directly formed on and protrude from the outer side surface of the upper limiting part 11. Nevertheless, when the connecting ring 13 separates the connecting part 14, the connecting arm 15, and the engaging protrusion 6 from the upper limiting part 11, it helps to reduce manufacturing difficulty.

In an embodiment, a screw that is threadedly connected to the connecting ring 13 may extend through the upper limiting part 11 in the vertical direction, so that the connecting ring 13 rotates in synchronization with the lifting column 2. Refer to FIG. 3, in this embodiment, in order to reduce the use of fasteners, and reduce the assembling difficulty and manufacturing cost, a groove 26 is formed in the upper end surface of the connecting ring 13. The lower end surface of the upper limiting part 11 has a protrusion 16 corresponding to the groove 26. When the projection 16 is disposed in the groove 26, the connecting ring 13 and the lifting column 2 are connected for synchronized rotation.

Referring to FIGS. 3 and 4, a first stopping part 17 extending horizontally in a direction away from the battery 1 is disposed on a side of the pressing sleeve 3 away from the battery 1. An end of the first stopping part 17 is adjacent to the pressing sleeve 3, and another end of the first stopping part 17 is connected to the vehicle body. The first stopping part 17 has elasticity. A second stopping part 18 protrudes from the outer side surface of the pressing sleeve 3. The height of the second stopping part 18 is equal to that of the first stopping part 17. In this way, when the pressing arm 4 rotates away from the top of the battery 1, the first stopping part 17 is deformed by being pressed by the second stopping part 18, and then allows the second stopping part 18 to move in the circumferential direction from one side to another side of the first stopping part 17. That is, after the pressing arm 4 rotates away from the top of the battery 1, the first stopping part 17 blocks the second stopping part 18 to prevent the pressing arm 4 from easily rotating in the clockwise direction to get back to its normal working position, and thus from impeding inserting and removing the battery 1, for example, when the parked vehicle body is tilted with respect to the ground surface. It can be understood that the force exerted by the second stopping part 18 on the first stopping part 17 to deform the first stopping part 17 and make the first stopping part 17 avoid the second stopping part 18 may be less than the force required to disengage the elastic engaging structure 30, so as to ensure that the second stopping part 18 can pass over the first stopping part 17 in the circumferential direction by rotating the lifting column 2. In addition, in order to prevent the pressing arm 4 from continuously rotating in the counterclockwise direction to the position where the battery 1 is inserted after the second stopping part 18 passes over the first stopping part 17 to impede inserting and removing the battery 1, in an embodiment, an additional blocking part may be provided on the side of the first stopping part 17 away from the second stopping part 18. The blocking part may be configured to abut against the second stopping part 18 after the second stopping part 18 passes over the first stopping part 17, so as to prevent the pressing arm 4 from continuously rotating in the counterclockwise direction.

Referring to FIGS. 3 and 4, the upper limiting part 11 is located at the upper end of the lifting column 2. The upper end surface of the upper limiting part 11 is further provided with a rectangular projection as a turning part 19, which can facilitates rotating the lifting column 2.

Second Embodiment

Figure 7:
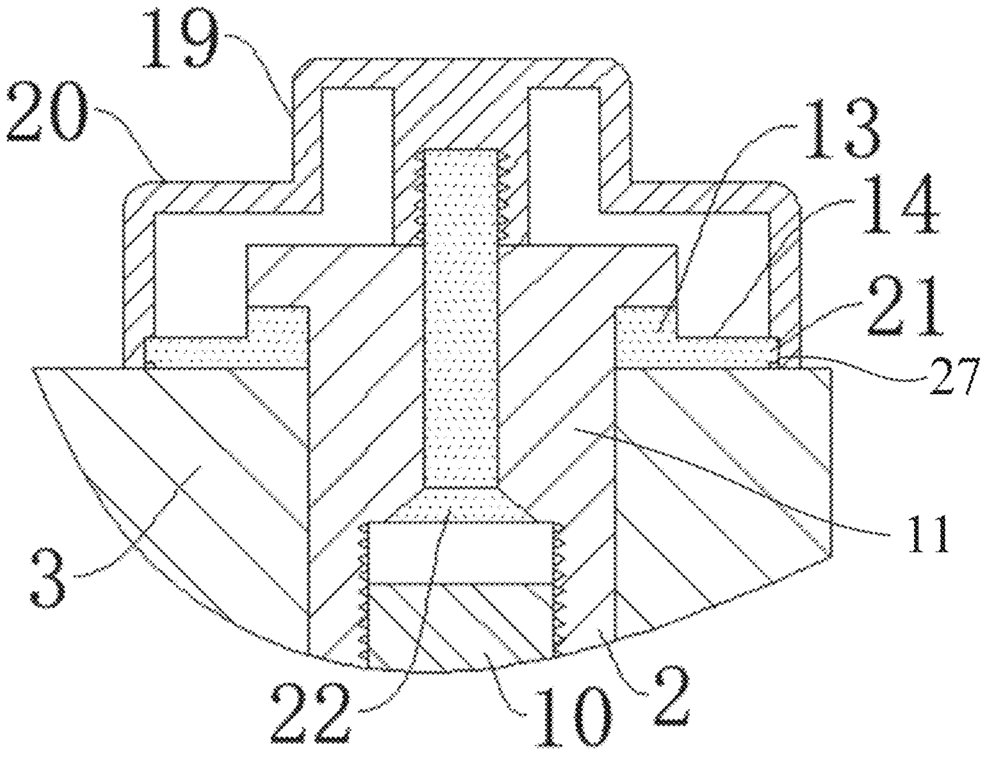
FIG. 7 is a schematic sectional view, taken along a line B-B in FIG. 4, showing a portion of the battery securing component according to a second embodiment.

Referring to FIG. 7, the differences between the second embodiment and the first embodiment are described below. The upper end of the lifting column 2 is provided with a turning cap 20. The turning cap 20 has an opening facing downward and is fixedly connected to the lifting column 2 by a screw 22. A lower end of the turning cap 20 is adjacent to the pressing sleeve 3. The upper end of the lifting column 2, the upper limiting part 11, the connecting ring 13, the connecting part 14 and the connecting arm 15 are all located inside the turning cap 20. The free end of the connecting part 14 has a side limiting part 21 protruding radially. A side limiting groove 27 matching the side limiting part 21 is formed on an inner wall of the turning cap 20. The side limiting groove 27 extends to the lower end of the turning cap 20 in the vertical direction. The side limiting part 21 is located in the side limiting groove 27, so that the connecting ring 13 and the lifting column 2 are connected for synchronized rotation. Similarly, a portion of the turning cap 20 higher than the upper limiting part 11 has a flat shape in a direction away from the lifting column 2 to form the turning part 19. A length of the turning part 19 corresponds to an outer diameter of the turning cap 20, so that the turning cap 20 is rotated to drive the lifting column 2 to rotate, and thus realizing upward and downward movements of the lifting column 2.

In this way, the upper limiting part 11, the connecting ring 13, the connecting part 14 and the connecting arm 15 are covered by the turning cap 20, so as to reduce the exposure of these components, and improve the appearance. With the engagement between the side limiting groove 27 on the turning cap 20 and the side limiting part 21 at the free end of the connecting part 14, the connecting ring 13 and the lifting column 2 are connected for synchronized rotation. Compared with the first embodiment, the position of the engagement is further away from the rotation axis in the radial direction, so the structural strength is better. In addition, in this embodiment, the upper end surface of the upper limiting part 11 has a through hole extending in the vertical direction. The through hole is in communication with the screw hole of the lifting column 2 below it. The screw 22 sequentially extends through the screw hole and the through hole from bottom to top, and is threadedly connected to an inner surface of the turning cap 20, so that the screw 22 is not exposed, which helps improving the appearance.

The battery securing component of the present disclosure can solve the technical problem of inconvenient use of the current battery securing component of the electric motorcycle, and enable convenient operations and a favorable appearance design.

Compared with the prior art, the present disclosure has the following beneficial effects.

Firstly, in the battery securing component of the present disclose, the lifting column has functions of driving the pressing sleeve to rotate and moving the pressing sleeve up and down, so that such battery securing component is simple in structure and practical. By arranging an elastic engaging structure, which can be disengaged when being subjected to force in a circumferential direction, between the pressing sleeve and the lifting column, and correspondingly arranging a pressure receiving groove with two sidewalls of different heights in the circumferential direction, on the top of the battery, the pressing arm can be rotated in synchronization with the lifting column before rotating in the clockwise direction to be above the pressure receiving groove, and after moving upward in the counterclockwise direction and being separated from the pressure receiving groove. The pressing arm can only move up and down with the rotation of the lifting column after rotating with the lifting column to be above the pressure receiving groove, and before moving upward in the counterclockwise direction and being separated from the pressure receiving groove. In this way, the locking and unlocking operations of the battery only require rotating the lifting column. This makes the operations simple, can effectively solve the problem of inconvenient use of the conventional battery securing component of the electric motorcycle, and is beneficial for improving user experience and product competitiveness.

Secondly, the battery securing component of the present disclosure has good compatibility with the battery of different sizes and shapes. When the mounting position of the battery is not accurate, the battery securing component can still achieve a good pressing and securing effect on the battery. The battery securing component can be used not only for a straddle-type electric motorcycle, but also for a variety of types of vehicles. For example, the battery securing component may be arranged below the seat cushion of a pedal-type electric motorcycle in place of the seat cushion, thereby providing a more stable and reliable pressing effect on the battery.

Thirdly, according to the battery securing component of the present disclosure, since the battery compartment is designed to be open, the battery compartment cover is omitted, thereby saving the cost and the space occupied. The battery can be inserted or removed by only rotating the pressing arm by 90 degrees or less, so that the possibility of interference with other structural components on the vehicle body is relatively small, which is beneficial to reduce the difficulty in design and manufacturing, and improving the aesthetic of the design.

Finally, it should be noted that the above embodiments are only used to illustrate the technical solutions of the present disclosure rather than to limit the technical solutions. Those of ordinary skill in the art should understand that any modification or equivalent substitution to the technical solutions of the present disclosure without departing from the concept and scope of the technical solutions should be fallen in the scope of the claims of the present disclosure.

What is claimed is:

1. A battery securing component configured to be mounted on a vehicle body, wherein a battery is vertically disposed on the vehicle body, the battery securing component comprises:

a lifting column vertically arranged on a side of the battery, and a lower end of the lifting column being threadedly connected to the vehicle body, to cause the lifting column to be capable of moving up and down by rotating;

a pressing sleeve rotatably sleeved on the lifting column and configured to be moved up and down in synchronization with the lifting column; a pressing arm being formed on the pressing sleeve by protruding toward the battery, the pressing arm being higher than the battery; and an elastic engaging structure configured to drive the pressing sleeve to rotate in synchronization with the lifting column, and arranged between the pressing sleeve and the lifting column, wherein a pressure receiving groove is formed on a top of the battery and adapted to the pressing arm, and the pressing arm is capable of falling into the pressure receiving groove to press and secure the battery, wherein in a circumferential direction of the pressing sleeve, there is a height difference between upper edges of a higher sidewall and a lower sidewall of the pressure receiving groove, wherein the higher sidewall is located on a path along which the lifting column rotates to move down, and the lower sidewall is located on a path along which the lifting column rotates to move up; and wherein when the lifting column drives the pressing sleeve to rotate until the pressing arm abuts against any one of the higher sidewall and the lower sidewall of the pressure receiving groove and continues to rotate, the elastic engaging structure is elastically disengaged, and the pressing sleeve only moves up and down synchronously with the lifting column and rotates relative to the lifting column.

2. The battery securing component according to claim 1, wherein the elastic engaging structure comprises:

an engaging groove formed on an end surface or an inner side surface of the pressing sleeve, and an engaging protrusion matching the engaging groove, wherein in the circumferential direction of the pressing sleeve, two sidewalls of the engaging groove are inclined, and a top opening size of the engaging groove is greater than a bottom size of the engaging groove;

wherein the engaging protrusion is connected to the lifting column through an elastic member, the engaging protrusion is engaged into the engaging groove under an action of the elastic member, wherein when the engaging protrusion is located in the engaging groove, the pressing sleeve rotates in synchronization with the lifting column; and wherein when the lifting column drives the pressing sleeve to rotate until the pressing arm abuts against any one of the higher sidewall and the lower sidewall of the pressure receiving groove and continues to rotate, each of the inclined sidewalls of the engaging groove abuts against the corresponding engaging protrusion to cause the engaging protrusion to be disengaged from the engaging groove, and the pressing sleeve is rotatable relative to the lifting column, and the elastic member is elastically deformed and cause the engaging protrusion to maintain a tendency to move toward the pressing sleeve.

3. The battery securing component according to claim 1, wherein a plurality of the engaging grooves and a plurality of the engaging protrusions are evenly distributed on the pressing sleeve in the circumferential direction of the pressing sleeve, and the number of the engaging grooves is greater than the number of the engaging protrusions.

4. The battery securing component according to claim 1, wherein the lifting column has an upper limiting part and a lower limiting part that protrude in a radial direction, and the pressing sleeve abuts against and is between the upper limiting part and the lower limiting part in a vertical direction, and the pressing sleeve is capable of moving up and down synchronously with the lifting column.

5. The battery securing component according to claim 4, wherein an annular groove is formed on the lifting column and below the pressing sleeve, an elastic stop ring is disposed in the annular groove, and a portion of the elastic stop ring outside the annular groove serves as the lower limiting part.

6. The battery securing component according to claim 2, wherein the engaging groove is formed on an upper end surface of the pressing sleeve, and the engaging protrusion is connected to the upper limiting part through the elastic member.

7. The battery securing component according to claim 2, wherein the lifting column has an upper limiting part and a lower limiting part that protrude in a radial direction, the pressing sleeve is located between the upper limiting part and the lower limiting part, a connecting ring abuts against and is between an upper end of the pressing sleeve and the upper limiting part; a lower end of the pressing sleeve abuts against the lower limiting part, and the pressing sleeve is capable of moving up and down synchronously with the lifting column; and the connecting ring is sleeved on the lifting column, is connected to the lifting column and rotatable in synchronization with lifting column, a connecting part is formed on an outer side surface of the connecting ring by protruding radially, a free end of the connecting part is bent and extends in the circumferential direction to form a connecting arm, a free end of the connecting arm protruding downward to form the engaging protrusion, and the connecting arm is configured as the elastic member.

8. The battery securing component according to claim 7, wherein a groove is formed on an upper end surface of the connecting ring, a lower end surface of the upper limiting part has a protrusion corresponding to the groove, wherein when the protrusion is located in the groove, the connecting ring and the lifting column are connected for synchronized rotation.

9. The battery securing component according to claim 7, wherein an upper end of the lifting column is provided with a turning cap having an opening facing downward, wherein the turning cap is fixedly connected to the lifting column by a screw, a lower end of the turning cap is adjacent to the pressing sleeve, the upper end of the lifting column, the upper limiting part, the connecting ring, the connecting part and the connecting arm are all located inside the turning cap, a side limiting part protrudes from the connecting part radially, a side limiting groove matching the side limiting part is formed on an inner wall of the turning cap, wherein the side limiting groove extends to the lower end of the turning cap in a vertical direction, and when the side limiting part is located in the side limiting groove, the connecting ring and the lifting column are connected for synchronized rotation.

10. The battery securing component according to claim 1, wherein a side of the pressing sleeve away from the battery is provided with a first stopping part, wherein an end of the first stopping part is adjacent to the pressing sleeve and another end of the first stopping part is connected to the vehicle body, the first stopping part has elasticity, a second stopping part protrudes from an outer side surface of the pressing sleeve, and a height of the second stopping part is equal to a height of the first stopping part; and when the pressing arm rotates away from a top of the battery, the first stopping part is deformed by being pressed by the second stopping part, and allows the second stopping part to move in the circumferential direction from one side to another side of the first stopping part.

* * * * *